(12) United States Patent
Lai et al.

(10) Patent No.: US 9,244,730 B2
(45) Date of Patent: Jan. 26, 2016

(54) APPLICATION WORKFLOW INTEGRATION SUBSYSTEM

(75) Inventors: Henry Lai, West Windsor, NJ (US); Steven Anthony Marusic, Cochranville, PA (US); Steven Octaviano, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1976 days.

(21) Appl. No.: 12/369,580

(22) Filed: Feb. 11, 2009

(65) Prior Publication Data
US 2010/0205616 A1 Aug. 12, 2010

(51) Int. Cl.
*G06F 9/48* (2006.01)

(52) U.S. Cl.
CPC ...................................... *G06F 9/485* (2013.01)

(58) Field of Classification Search
None
See application file for complete search history.

(56) References Cited

U.S. PATENT DOCUMENTS

| | | | |
|---|---|---|---|
| 6,817,008 B2 | 11/2004 | Ledford et al. | |
| 7,051,071 B2 | 5/2006 | Stewart et al. | |
| 7,246,144 B2 | 7/2007 | Walsh et al. | |
| 7,424,717 B2 | 9/2008 | Blevins | |
| 7,426,548 B2 | 9/2008 | Griffin et al. | |
| 8,732,595 B2 * | 5/2014 | Schmidt et al. | 715/763 |
| 2003/0097345 A1 | 5/2003 | Upton | |
| 2005/0193061 A1 | 9/2005 | Schmidt et al. | |
| 2005/0216555 A1 * | 9/2005 | English et al. | 709/204 |
| 2006/0085412 A1 | 4/2006 | Johnson et al. | |
| 2006/0155525 A1 * | 7/2006 | Aguilar et al. | 703/26 |
| 2006/0224702 A1 | 10/2006 | Schmidt et al. | |
| 2006/0259603 A1 | 11/2006 | Shrader et al. | |
| 2006/0282241 A1 * | 12/2006 | Liang et al. | 703/6 |
| 2007/0027801 A1 * | 2/2007 | Botzer et al. | 705/39 |
| 2007/0233535 A1 * | 10/2007 | Kim | 705/7 |
| 2008/0010082 A1 * | 1/2008 | Jiang et al. | 705/1 |
| 2008/0282250 A1 * | 11/2008 | Marin et al. | 718/102 |

* cited by examiner

*Primary Examiner* — Tuan Dao
(74) *Attorney, Agent, or Firm* — John R. Pivnichny; Law Office of Jim Boice

(57) ABSTRACT

A computer-implemented method, system and computer program product for integrating an application engine with processes depicted by a flow-chart created by a Business Process Management (BPM) engine are presented. Execution of a first application, which is generated by a first application engine, is initiated. The first application performs a first subtask that is depicted by a first component of a flow-chart that has been previously generated by the BPM engine. A Workflow Integration Subsystem (WIS), which provides an interface between the first application engine and the BPM engine, selects the flow-chart that contains the first subtask performed by the first application. The BPM engine calls other application engines to perform other subtasks that supplement the first subtask, such that the first subtask and the other subtasks combine to perform an entire task that is depicted by the flow-chart.

16 Claims, 6 Drawing Sheets

APPLICATION WORKFLOW INTEGRATION SUBSYSTEM

BACKGROUND OF THE INVENTION

1. Technical Field

The present disclosure relates to the field of computers, and specifically to logic for managing processes running on computers.

2. Description of the Related Art

One criterion in which software can be classified is level of specificity. That is, some software is designed for a specific function, while other software is designed for a broader range of functions that may be related to, and may actually include, the specific function of the narrower software. Narrowly designed software may be referenced as a Vertical Market (VM) software application, while an exemplary broader software may be a Business Process Management (BPM) software solution. A BPM software solution is typically based on and/or generates a flowchart of global business processes. For example, a VM software application may be a data entry program used to apply for a land title search, while a BPM software solution may be a tool that allows a user to flowchart all steps taken to sell a real estate mortgage. When a next step in the flowchart is to be taken, a back-office VM software application is called by the BPM software to perform that next step. Current processes require a complex and non-scalable system of Application Program Interfaces (APIs) to call the back-office applications. Building such custom integration solutions usually results in multiple VM application code bases and much greater effort required for VM software maintenance and upgrades. An alternative to multiple code bases is to integrate with a single BPM engine.

SUMMARY OF THE INVENTION

To address the above described issue, a computer-implemented method, system and computer program product for integrating applications into a workflow are presented. Execution of a first application, which is generated by a first application engine, is initiated. The first application performs a first subtask that is depicted by a first component of a flow-chart that has been previously generated by a Business Process Management (BPM) engine. A Workflow Integration Subsystem (WIS), which provides an interface between a BPM engine and multiple application engines, locates and selects the specific application engine (based on the first subtask in the flow-chart) that will perform the first subtask. The BPM engine then calls other application engines to perform other subtasks that supplement the first subtask, such that the first subtask and the other subtasks combine to perform an entire task depicted by the flow-chart. Although only one BPM engine will be deployed for a given installation, the WIS allows for easy integration with a variety of commercially available BPM engines in order to meet customer preference and changing "best-of-breed" BPM offerings.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
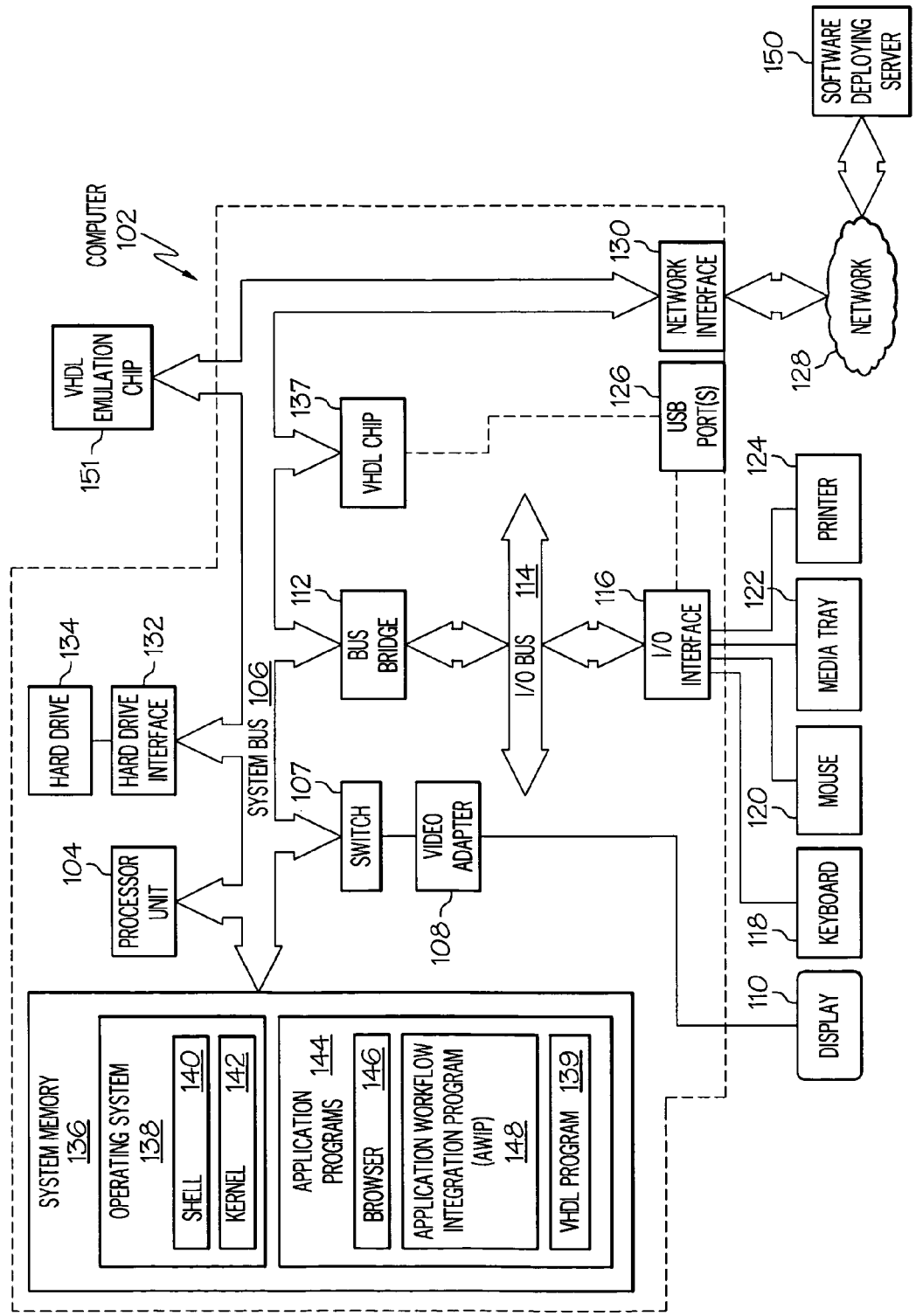
FIG. 1 depicts an exemplary computer in which the present invention may be implemented.

With reference now to the figures, and in particular to FIG. 1, there is depicted a block diagram of an exemplary computer 102, which may be utilized by the present invention. Note that some or all of the exemplary architecture shown for computer 102 may be utilized by software deploying server 150.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., Application Workflow Integration Program—AWIP 148 described below) that perform the method described herein. This switching causes a substantive transformation of the computer 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), USB port(s) 126. While the format of the ports connected to I/O interface 116 may be any known to those skilled in the art of computer architecture, in a preferred embodiment some or all of these ports are Universal Serial Bus (USB) ports.

As depicted, computer 102 is able to communicate with a software deploying server 150 via network 128 using a network interface 130. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include an Application Workflow Integration Program (AWIP) 148. AWIP 148 includes code for implementing the processes described below, including those described in FIGS. 2-6. In one embodiment, computer 102 is able to download AWIP 148 from software deploying server 150, including in an on-demand basis. Note further that, in one embodiment of the present invention, software deploying server 150 performs all of the functions associated with the present invention (including execution of AWIP 148), thus freeing computer 102 from having to use its own internal computing resources to execute AWIP 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from AWIP 148 causes VHDL program 139 to configure VHDL chip 137, which may be an FPGA, ASIC, etc. This programming of VHDL chip 137 causes a substantial transformation of the architecture of computer 102, wherein (assuming that USB port(s) 126 are NOT coupled to I/O interface 116) USB port(s) 126 are now selectively coupled to system bus 106 via VHDL chip 137.

In another embodiment of the present invention, execution of instructions from AWIP 148 results in a utilization of VHDL program 139 to program a VHDL emulation chip 151. VHDL emulation chip 151 may incorporate a similar architecture as described above for VHDL chip 137. Once AWIP 148 and VHDL program 139 program VHDL emulation chip 151, VHDL emulation chip 151 performs, as hardware, some or all functions described by one or more executions of some or all of the instructions found in AWIP 148. That is, the VHDL emulation chip 151 is a hardware emulation of some or all of the software instructions found in AWIP 148. In one embodiment, VHDL emulation chip 151 is a Programmable Read Only Memory (PROM) that, once burned in accordance with instructions from AWIP 148 and VHDL program 139, is permanently transformed into a new circuitry that performs the functions of element 206 shown below in FIG. 2. Thus, VHDL emulation chip 151 is also properly viewed as a machine that is under the control of computer 102. Note that while VHDL emulation chip 151 is depicted as being a different entity that is separate from computer 102, in another embodiment VHDL emulation chip 151 may be an integral part of computer 102.

Note that the hardware depicted in FIG. 1 may be utilized as hardware means for implementing the present invention. For example, processor 104 may be initiation logic for initiating execution of a first application, wherein the first application is generated by a first application engine, wherein the first application performs a first subtask, and wherein the first subtask is depicted by a first component of a flow-chart that has been previously generated by a BPM engine. Furthermore, processor 104 may be selection logic for selecting, by a Workflow Integration Subsystem (WIS) that logically couples the first application engine and the BPM engine, a specific flow-chart containing a depiction of the first subtask performed by the first application. Similarly, processor 104 may be used as calling logic for calling other applications, by the specific BPM engine, to perform other subtasks that supplement the first subtask, wherein the first subtask and the other subtasks combine to perform a task depicted by the flow-chart that has been previously generated by the BPM engine; calling the other applications to fully enable the flow-chart that has been previously created by the BPM engine, wherein a fully enabled flow-chart includes calls to the other applications and the first application to create a fully executable process that performs all steps depicted in the task that is depicted by the flow-chart that has been previously generated by the BPM engine; and for calling a rule engine to determine which ABOs are needed to complete an enabling of the flow-chart. Similarly, processor 104 may be selection logic for selecting the specific flow chart according to a rule from a rules engine or information acquired from a data base that is coupled to the WIS, wherein the rule or data describes which flow-chart matches an intended use for the first application.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
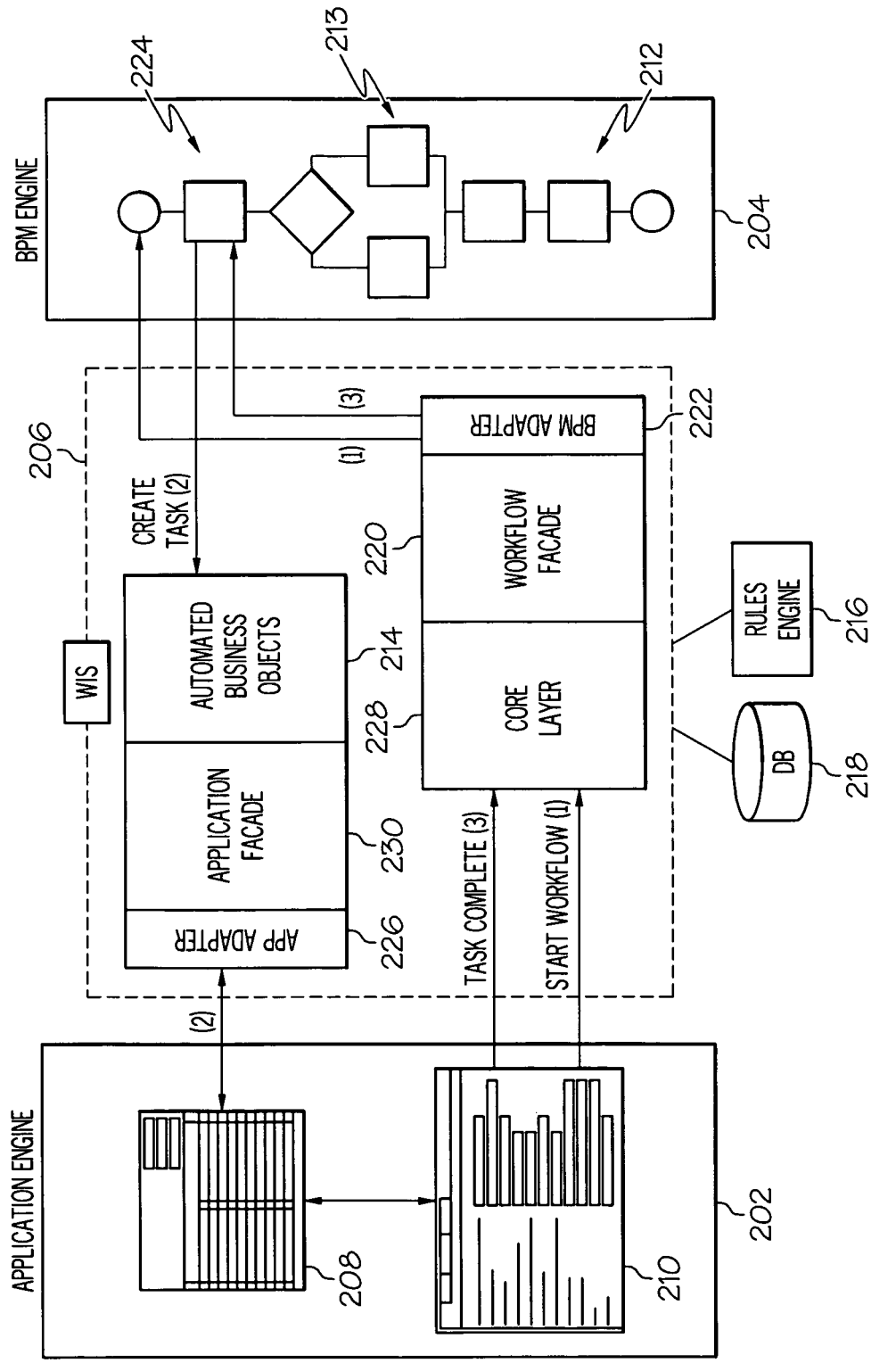
FIG. 2 illustrates a high-level overview of an interaction between an application engine and a Business Process Management (BPM) engine via a novel and inventive Workflow Integration Subsystem (WIS)

With reference now to FIG. 2, a high-level overview of an interaction between an application engine 202 and a Business Process Management (BPM) engine 204 via a novel and inventive Workflow Integration Subsystem (WIS) 206. For purposes of illustration, assume that application engine 202 drives a "to do" screen 208 and a data entry Graphical User Interface (GUI) 210 for taking a loan application. The items listed on the "to do" screen 208 are limited to only those tasks associated with taking the loan application. In order to actually deliver a loan to a customer, however, there are many other tasks that need to be performed. These other tasks are depicted at a high-level by the flow-chart 212 that is created by the BPM engine 204. For example, such a loan may require that a credit report for the applicant be pulled, formal documents be printed, etc. Such steps are enacted by Automated Business Objects (ABOs) 214. Thus, ABOs 214 are engines that do the work that is requested by the BPM engine 204 (e.g., services 224). Other examples of ABOs 214 in the context of processing a loan application include, but are not limited to, requesting that a third party service (e.g., a property appraisal, a determination of the need for flood insurance, etc.); requesting that a task be added to a work queue (e.g., populated on the "to do" list 208); requesting that a unique condition (e.g., borrower must provide W2 form; borrower must provide gift letter; etc.) be added to the loan; requesting that a special fee (e.g., a "finder's fee") be added to the loan; request than an e-mail be sent to the borrower, underwriter, and or lender at key times during the loan process (e.g., reminders of closing meeting date and time, etc.); request that data be validated (e.g., by a "second set of eyes" or by electronic or programmatic means such as data validation through a rules engine 216); requesting that a decision on whether to approve the loan or not be performed by a rules engine (e.g., rules engine 216); etc.

As depicted in FIG. 2, WIS 206 may be associated with a rules engine 216 and a database 218. The rules engine 216 executes a unique set of rules that are applied to data in database 218 in order to render a decision (e.g. Is loan amount greater than $350,000?). The results of these decisions can then be used by the application engine 202 and/or the BPM engine 204 to determine which work-flow to execute, which path to take through the work-flow, etc. The same hardware, network and operating system requirements for computers that run both the application engine 202 and the BPM engine 204 can also be used to run the rules engine 216. Examples of rules include, but are not limited to external business conditions (e.g., bond rates that must be at a certain minimum or maximum level before a loan process can be initiated) that must be met before the BPM engine 204 can be called by the application engine 202; etc. The database 218 stores the data against which these rules are applied and the rules engine 216 stores the rules. The database may also store the decisions returned from the rules engine, such as external conditions, data that is specific for a particular loan applicant/application, etc.

Note that the initial interaction between the application engine 202 and the BPM engine 204 is initiated by the application engine 202. This initial interaction from application engine 202 to BPM engine 204 is typically initiated by an event occurring in application engine 202 (e.g. a new mortgage application is imported into application engine 202). That is, BPM engine 204 does not merely call for applications from application engine 202 in order to satisfy the needs of steps described by flow-chart 212, but WIS 206 also intelligently formats and submits requests from application engine 202 to meet the specific communication requirements for the BPM engine 204 that is in use. The request from BPM engine 204 starts execution of a particular flow-chart that will initiate additional steps that are needed to make the process of the initial application meaningful. Thus, WIS 206 is able to intelligently locate and identify which flow-chart from multiple flow-charts stored within BPM engine 204 that describes the operation of the application from application engine 202. WIS 206 will also intelligently locate the correct application engine and application to complete a particular task requested by the BPM engine 204. For example, assume that changing a particular piece of data (e.g. social security number) within the application from application engine 202 requires that a new task of re-pulling a credit report for a customer be executed. WIS 206, through information and rules stored in database 218 and rules engine 216, will "know" that this task must be performed by a particular application, and therefore will route the task to the particular application that is designed to pull credit reports. Thus, the WIS 206 first matches the operation of requesting a credit report that came from the application engine 202 to the appropriate flow-chart within the BPM engine 204, and then matches the tasks associated with the credit check operation coming back from the BPM engine 204 to the appropriate application from application engine 202. When the task is completed within the application, the application communicates back to the BPM engine 204, through the WIS 206, that the task has been completed so that the flow-chart/BPM engine 204 can intelligently perform other steps needed by the process that was begun by the credit check operation.

An application from the application engine 202 is able to interface with the WIS 206 through the core layer 228 and the workflow façade 220. The workflow façade 220 then uses a BPM specific adapter to interface with the BPM engine 204. The BPM engine 204 is "data-blind" with reference to the actual application that is being run from the application engine 202. In other words, the BPM engine 204 needs little or no data from the Application Engine 204 or the database 218 to operate. The BPM engine 204 acts only as an orchestration layer in order to automate processes and/or the creation of human tasks.

Note that while only a single application engine 202 is illustrated, it is to be understood that WIS 206 is actually coupled to multiple application engines 202. Utilizing the methodology described herein (including the use of rules engine 216), WIS 206 is able to select the appropriate workflow (flow-chart) that is a sub-task of the complete business process to be performed by the specific application from application engine 202. Thus, rather than BPM engine 204 initially calling for applications to execute steps 213 and 224 depicted in its flow-chart 212, application engine 202 is able to call (using WIS 206) an appropriate work-flow (either flow-chart 212 or another flow-chart). The BPM engine 204 sends a request to the WIS 206 requesting that a task be executed. The WIS "knows" which application from application engine 202 it should use to implement the step depicted in block 224. The subtask performed by this application is thereafter augmented with other subtasks depicted in flow-chart 212 (and enabled by other applications from other application engines) to create a fully executable process to perform a complete task.

In a preferred embodiment, WIS 206's primary function is to integrate a Business Process Management (BPM) Engine 206 into a software application. WIS 206 is deployed as an embedded component within an application and can communicate between either an application-embedded BPM Engine or an external BPM Engine. In a preferred embodiment, BPM Engine 204 (whether an application-embedded BPM Engine or an external BPM Engine) is a third party application that is used to orchestrate business processes (human tasks and/or automated tasks and/or activities) within a software application and across multiple software applications such as application 202. Note also that, in a preferred embodiment, BPM Engine 204 never communicates with an application in application engine 202 itself without going through WIS 206, and vice versa.

WIS 206's architectural design enables integration to be very simple between various different applications and BPM Engines. That is, although BPM Engine 204 is depicted as being coupled to only a single application 305 in FIG. 3, in a preferred embodiment multiple different applications are able to call on a single BPM Engine 204, thus allowing multiple users and/or applications to be integrated into a flow-chart that is created by a single BPM Engine 204.

As depicted, WIS 206 is divided into multiple layers that separate the logic employed by the application 202, WIS 206, and BPM Engine 204 such that applications and BPM Engines become "Plug and Play" components that can be interchanged with each other. Thus, within WIS 206 are an application façade 230 and a workflow façade 220, which respectively present an interface to the respective application allowing communication from and to an application engine and BPM Engine. Logic that affords actual interfaces to the BPM Engine 204 and application 202 are respectively the Automated Business Objects 214 and core layer 228. Automated Business Objects 214 are described above as ABOs 214. Core layer 228 is code that receives information from the applications and can communicate between both the application façade 230 and the Workflow Façade 220.

In one embodiment, BPM Engine 204 is required to initiate task creation within the application from application engine 202. Thus, in this embodiment, the application from application engine 202 must maintain and store its own list of tasks which comprise a unique system generated task ID. In order for BPM Engine 204 to be able to optimally utilize WIS 206 for integration with this application, BPM Engine 204 has software-enabled logic for enabling the BPM Engine 204 to be able to uniquely identify a workflow-process definition (e.g., identify a particular process to be used for a particular step in a BPM-generated flow-chart). This workflow-process definition comprises a "start process" step, an "action step" (a step where work is done), and an "end process" step. In a preferred embodiment, BPM Engine 204 is able to uniquely identify an instance of a workflow-process definition. An instance of a workflow-process definition exists when one of the workflows (e.g., flow-chart 212) is started. Furthermore, BPM Engine 204 is able to uniquely identify a step within an instance of a workflow-process definition. In one embodiment, a step within a workflow-process definition requests that work be executed. These requests can be either blocking or non-blocking (synchronous or asynchronous) and the WIS 206 will handle each accordingly. That is, an asynchronous request does not require or receive a response back from the WIS 206 aside from notification that the initial request invocation was successful. A synchronous request will wait for notification (in the form of a return value or explicit Application Program Interface (API) call depending on the nature of the work) from the WIS that the task has been successfully completed and therefore the process should move forward.

WIS Detailed Component Description

BPM Engine 204 will create objects during workflow/process execution. These objects are referred to as Workflow Objects (WFOs). WIS 206 recognizes 3 particular WFOs: Workflow Instances, Workflow Tasks, and Workflow Error Logs. WIS 206 is essentially a state machine for WFOs—making certain that transitions between states and statuses are valid while maintaining transactional integrity/synchronization between the integrated application and BPM Engine.

Figure 3:
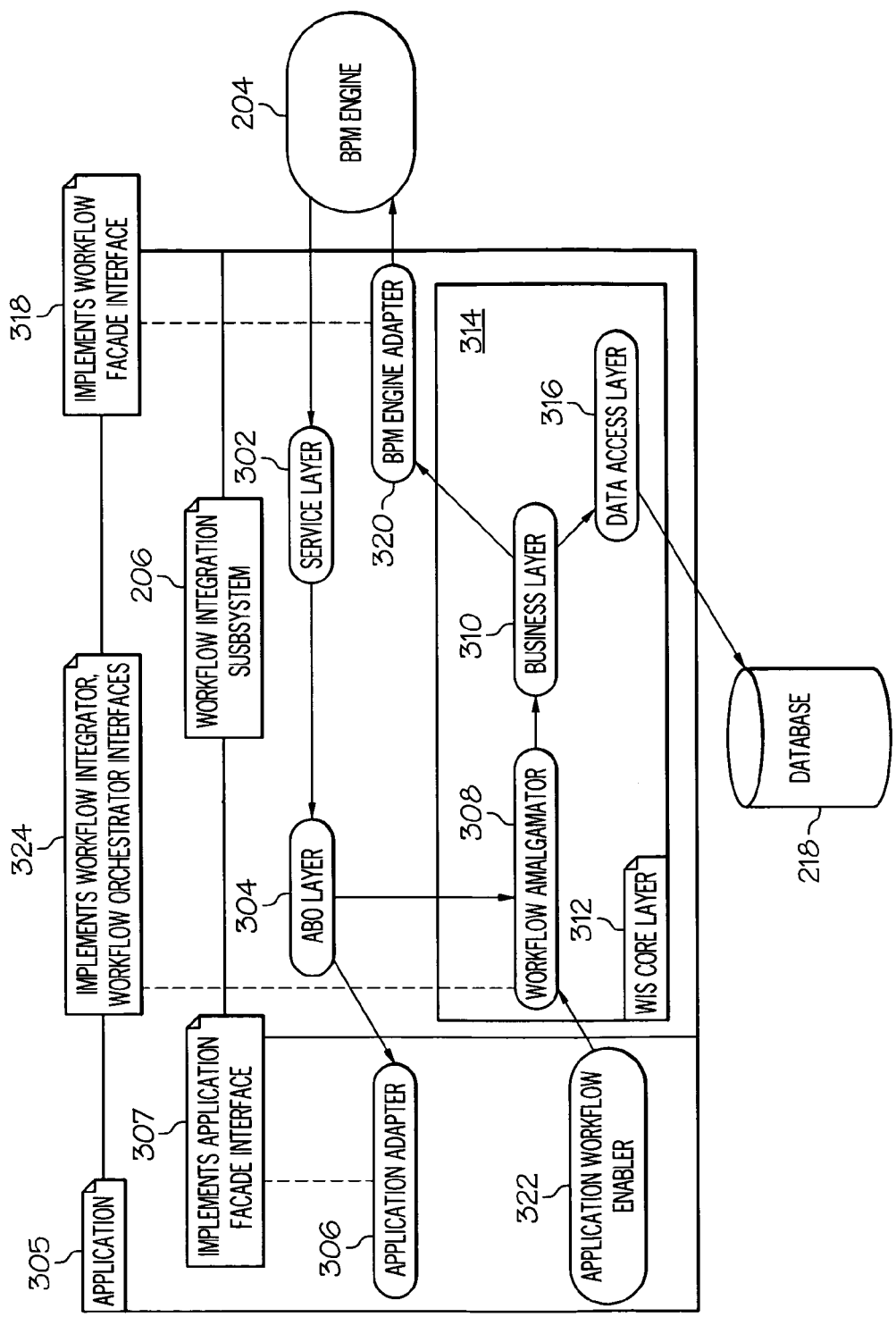
FIG. 3 illustrates additional detail of the WIS depicted in FIG. 2.

With reference now to FIG. 3, additional detail is shown for logic that supports WIS 206. WIS 206 includes a WIS Service Layer 302 that is made up of distributed objects such as Enterprise Java Beans (EJBs) or Web Services. WIS Service Layer 302 delegates a remote request from the BPM Engine 204 to an Automated Business Object (ABO) Layer 304 (discussed in more detail below). The specific objects and operations in the WIS Service Layer 302 vary based on the type of application (e.g., Loan Processing System, Stock Trade System, etc). An external BPM Engine 204 always communicates with the WIS 206 via the WIS Service Layer 302, unless, of course, if BPM Engine 204 is embedded within the application 305 itself.

ABO layer 304 is responsible for orchestrating requests from BPM Engine 204, through the WIS Service Layer 302, to the application 305. Specific ABOs and operations in the ABO layer 304 directly reflect those in the Service Layer 302, which are based on the type of application engine 202 shown in FIG. 2 (which provides the application 305 shown in FIG. 3). ABOs make requests to the application 305 using the Application Façade interface 307 (shown with application adapter 306) when work is required to be performed. In cases where the work involves creating a task within the application, newly created "Task Reference Identifier" is returned to the ABO. The ABO then delegates a request to the Workflow Orchestrator (depicted as a Workflow Amalgamator 308) to create a task correlation with the data (from database 218) provided by the BPM Engine 204 and the application 305. The Workflow Orchestrator utilizes an Application Workflow Enabler 322 and is within the WIS Core Business Layer 310. Thus, the initial flow from BPM Engine 204 to Application 305 is as follows:

BPM Engine>Service Layer>ABO Layer>Application Façade

Also within the ABO layer 304 are Workflow Manager Automated Business Objects. A Workflow Manager ABO is responsible only for direct communication between a BPM Engine 204 and the WIS 302 and as a result, does not follow the BPM Engine>Service Layer>ABO Layer>Application Façade flow that is shown above. Furthermore, Workflow Manager ABOs do not require a reference to the Application Façade implementation. Thus, the Workflow Manager ABO does not interact with the application 305, but only with the WIS 302.

The operations delegated by the Workflow Manager ABO are as follows:

Create a new workflow instance from within an existing workflow instance

Create a Workflow Error Log entry within the WIS

Send the WIS a notification that a Workflow Instance has completed

Execute clean-up actions (termination) on expired Workflow Instances within the WIS A WIS Core Layer 312 contains common logic that will remain unchanged regardless of what application, application type or BPM Engine is being integrated at any time. The main purpose of WIS Core Layer 312 is to keep the application 305 synchronized with the BPM Engine 204 with regard to tasks and workflow instances.

When the application 305 needs to communicate with the BPM Engine 204—to either create a new workflow instance or send a notification that a task has been started/completed—it will do so using a Workflow Integrator 314 interface. The Workflow Integrator 314 is part of the WIS Core Business Layer 312, and will synchronize its own records of workflow instances and task correlations with those of the application 305 and BPM Engine 204. This is done by the other half of the WIS Core—the Data Access Layer 316. Data Access Layer 316 separates all data access logic from business logic within the WIS 206.

Ultimately, the WIS 206 must communicate the application's request to the BPM Engine 204. This is done using the Workflow Façade interface 318 and BPM Engine Adapter 320. Implementations of the Workflow Façade interface 318 are BPM Engine specific. This separation of implementation allows the WIS 206 to integrate with many different BPM Engines while its Core (including WIS Core Layer 312) remains unchanged. Thus, integrating with a new BPM Engine only requires implementing the Workflow Façade interface's BPM Adapter for that particular engine.

Workflow Execution

Workflow Instances (e.g., flow-charts) can be created either by the application or the BPM Engine. When the BPM engine creates a Workflow Instance, it is the result of an existing Workflow Instance calling another workflow (sometimes called a sub-flow). To create a new Workflow Instance, the workflow identifier (usually the workflow definition name—depending on the BPM Engine) and the application reference data to be associated with the new Workflow Instance are required. Due to this requirement, all Workflow Instances are initially stateful based only on their application references. The WIS will make certain that there is only one Workflow Instance with an "Active" status within the BPM Engine for a given application reference at any given time.

All Workflow Instance States and Statuses are maintained by the WIS, and all Workflow Instance Actions are requested through the WIS.

Figure 4:
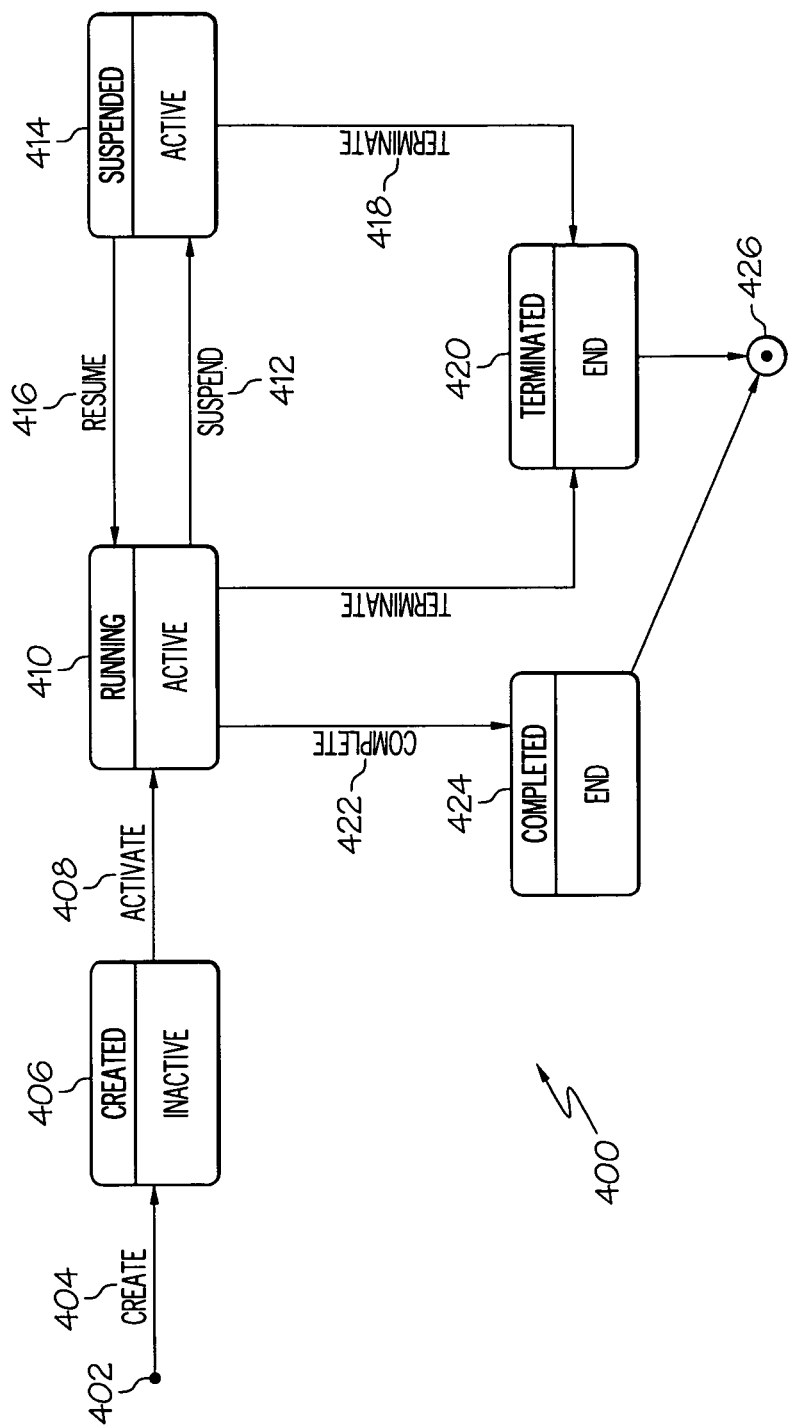
FIG. 4 depicts a diagram of steps taken to create a workflow instance by an application engine.

With reference now to FIG. 4, a diagram 400 shows Workflow Actions (line labels), Workflow States (underlined in boxes) and Workflow Statuses (not underlined in boxes), as well as valid State-to-State transitions (lines). After initiator 402, a create action 404 is performed. Create action 404 creates a new Workflow Instance. Calling Create Action 404 moves the Workflow Instance into the "Created" state 406. Activate Action 408 starts a "Created" Workflow Instance so that it begins executing steps and orchestrating processes. Calling this action moves the Workflow Instance into the "Running" state 410. Suspend Action 412 stops or pauses execution of a "Running" Workflow Instance. Calling Suspend Action 412 moves the Workflow Instance into the "Suspended" state 414. A Resume Action 416 can only be executed on a Workflow Instance that is in a "suspended" state. Calling Resume Action 416 restarts a suspended Workflow Instance and moves it back to "Running" state 510 so that it begins executing steps and orchestrating processes.

A Terminate Action 418 can only be executed on a Workflow Instance that is in either the "Running" or the "Suspended" state. Once Terminate Action 418 has been executed on a Workflow Instance, no other actions can be executed, and the Workflow Instance is moved into the "Terminated" state 420.

Complete Action 422 can only be executed by the Workflow Instance itself from the "Running" state 410. A Workflow Instance that successfully executed its process definition steps and has reached its logical "End" will execute this Complete Action 422. Once this action has been executed on a Workflow Instance, no other actions can be executed, and the Workflow Instance is moved into the "Completed" state 424. The process ends at terminator 426.

Workflow Instance States and Statuses

Created State 406. The initial Workflow Instance state is "Created" state 406. A Workflow Instance cannot begin in any state other than "Created" state 406. A Workflow Instance in "Created" state 406 has an "Inactive" status, which means the Workflow Instance is not executing steps or orchestrating business processes. There are only two states to which a "Created" Workflow Instance can be moved: Running and Terminated.

Running State 410. When a Workflow Instance is moved into "Running" state 410 it has an "Active" status. A Workflow Instance may execute steps and orchestrate business processes only when it is in "Running" state 410. There are three states to which a "Running" Workflow Instance can be moved: Suspended, Completed, and Terminated.

Suspended State 414. A Workflow Instance that has been moved into "Suspended" state 414 is still considered to have an "Active" status even though it is not executing steps and orchestrating business processes. There are two states to which a "suspended" Workflow Instance can be moved: "Running" state 410 and "Terminated" state 420.

Terminated State 420. When the Workflow Instance is in "Terminated" state 420, it has an "End" status. A Workflow Instance in "Terminated" state 420 cannot be moved to another state. In "Terminated" state 420, the Workflow Instance is not executing steps or orchestrating business processes.

Completed State 424. A Workflow Instance that has been moved into "Completed" state 424 is considered to have an "End" status. A Workflow Instance in "Completed" state 424 cannot be moved into any other state.

Workflow Task Creation

Workflow Task creation (interchangeable with Workflow Step creation within the WIS) is always triggered by the BPM Engine, but the software code to complete the tasks themselves are created and maintained by the application from the Application Engine 202. When a BPM Engine step is executed that involves creating a task, the invoked ABO will first make a call to the application, expecting a task to be created and the identifier of that newly created task to be returned. The ABO will then delegate a request to the Workflow Orchestrator implementation within the WIS Core Business Layer to create and store the Workflow Task (also referred to as the task correlation).

The BPM Engine can identify the step either by a step identifier or by an execution thread identifier (both generated and maintained within the BPM Engine itself).

Aside from any task-specific information required by the application, the BPM Engine must provide the following data to invoke the ABO:

1) Application reference data (provided by the application on workflow creation)
2) Workflow instance identifier (the workflow instance identifier from within the BPM Engine)
3) Workflow step identifier (workflow step identifier from within the BPM Engine)
4) Workflow step name (workflow step/task name)
5) Workflow step detail (workflow step/task details/description/instructions)
6) Boolean (true/false) value that will allow the WIS to determine if the BPM Engine is expecting notifications when this particular task's state changes After the BPM Engine makes the request, the preceding information is returned by the application to the ABO using an Application task identifier.

The six items and the Application task identifier just described make up the task correlation that is stored within the WIS, requested by the ABO.

Workflow Task Actions, States and Statuses

Figure 5:
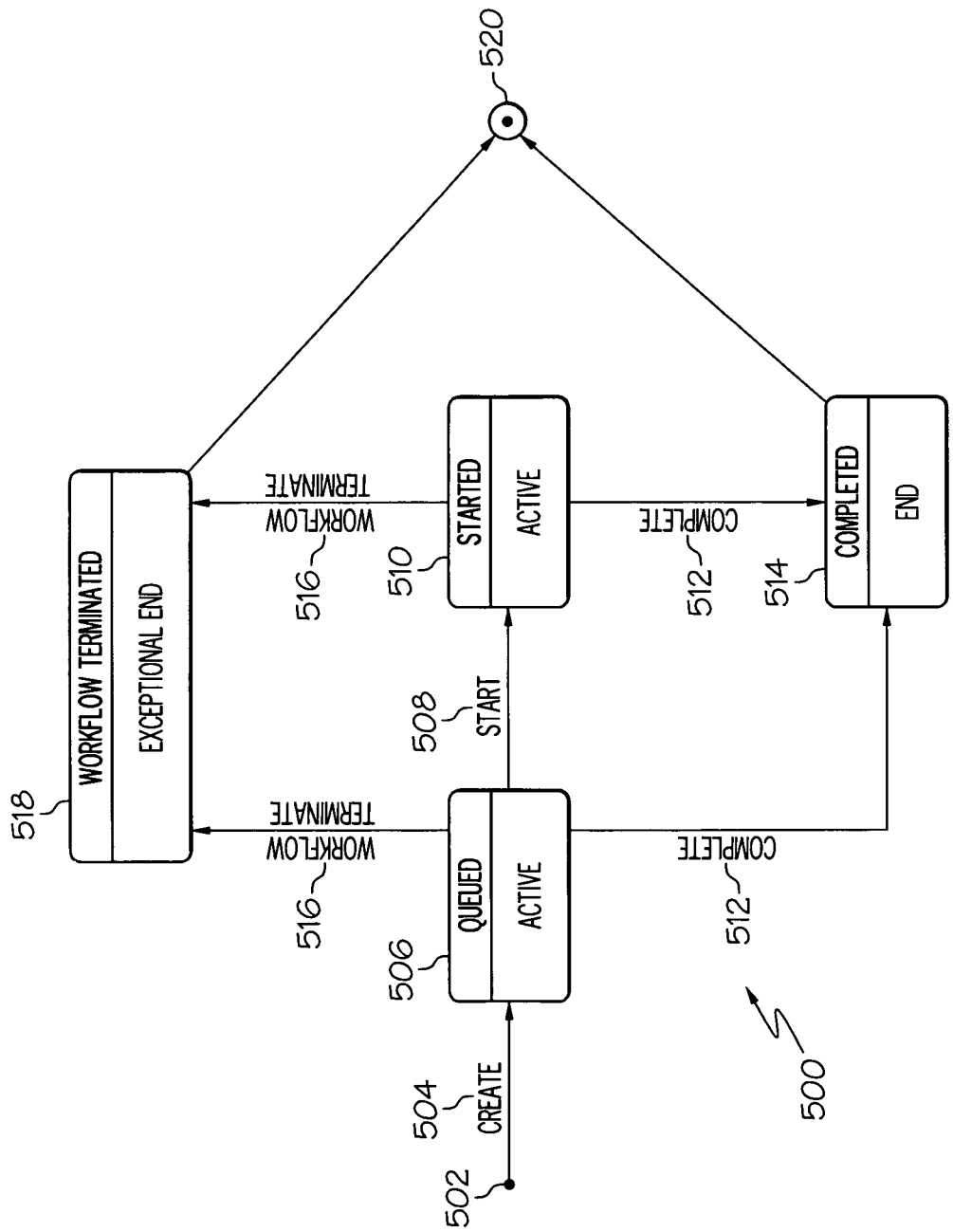
FIG. 5 illustrates a diagram of steps taken to create a workflow task by a BPM engine.

All Workflow Task States and Statuses are maintained by the WIS. All Workflow Task Actions are requested through the WIS. With reference now to FIG. 5, a diagram 500 shows Workflow Task Actions (line labels), Workflow Task States (underlined in boxes) and Workflow Task Statuses (not underlined in boxes), as well as valid State-to-State transitions (lines).

After initiator 502, a Create Action 504 creates the Workflow Task (task correlation) within the WIS. Calling this action moves the Workflow Task into the "Queued" state 506. A Start Action 508 indicates the Workflow Task has been started, and results from a notification sent by the application. Calling Start Action 508 moves the Workflow Task into the "Started" state 510.

Complete Action 512 indicates the Workflow Task has been completed, and also results from a notification sent by the application. This can be called on a Workflow Task in either the "Queued" state 506 or "Started" state 510. Calling this action moves the Workflow Task into the "Completed" state 514.

Workflow Terminate Action 516 indicates the Workflow Instance associated with the Workflow Task has been terminated. This can be called on a Workflow Task in either "Queued" state 506 or "Started" state 510. Calling this action moves the Workflow Task into the "Workflow Terminated" state 518. The process ends at terminator 520.

Workflow Task States and Statuses

Queued State 506. The initial Workflow Task state is "Queued." A Workflow Task cannot be created in any state other than "Queued." A Workflow Task in the "Queued" state has an "Active" status. Under normal circumstances, a "Queued" Workflow Task can be moved to one of the following states: Started or Completed. The task is started within the BPM Engine and completed within the WIS. This is done within a single transaction so all systems remain synchronized and the BPM Engine does not have to be made aware that a task might be completed without being started or vice versa.

Started State 510 is an intermediate (and optional) state in a Workflow Task's life cycle. A Workflow Task in "Started" state 510 has an "Active" status. Under normal circumstances, a "started" Workflow Task can only be moved to one other state: "Completed" state 514.

Completed State 514. "Completed" state 514 is the typical end of a Workflow Task's life cycle. A Workflow Task in "Completed" state 514 has an "End" status. A Workflow Task in "Completed" state 514 cannot be moved to any other state.

Workflow Error Logging

A Workflow Error Log entry represents an exceptional condition that has occurred within the BPM Engine. Similar to Workflow Task creation, Workflow Error Log creation can only be triggered by the BPM Engine. The difference between Workflow Error Logs and Workflow Tasks is that the application cannot trigger state transitions in the case of Workflow Error Logs but it is expected to trigger those transitions in the case of Workflow Tasks.

The common payload required in the creation of a Workflow Error Log entry is as follows:
1) Workflow instance identifier (the unique identifier of the workflow instance that incurred the error)
2) Request type (the type of request in process when the error was raised)
3) Workflow error type (the type of error raised within the BPM Engine)
4) Log detail (the detailed message associated with the log entry).

Some examples of workflow error types are:
1) Invocation errors that occur when a WIS service (or ABO) layer invocation fails in the BPM Engine; and
2) Timeout errors, which are usually related to tasks and can occur in the following situations:
   waiting for a task to transition to the started state;
   waiting for Task Start;
   waiting for a task to transition to the completed state from a started state;
   waiting for Task Complete; and
   waiting for a task to transition to the completed state from the initial state.

Since the application cannot trigger a Workflow Error Log transition, the WIS itself is responsible for it. Invocation errors are resolved on successful invocations of the service (or ABO) that had previously failed.

Timeout errors are resolved when the task that timed out reaches the state that the timeout was logged against. A task that transitions from a queued state to a started state will have any outstanding "Waiting for Task Start" timeout errors resolved. A task that transitions into a completed state will have all outstanding timeout errors associated with it resolved. This includes "Waiting for Task Start", "Waiting for Task Complete" and "Collective Timeout".

Workflow Error Log Actions, States and Statuses

Figure 6:
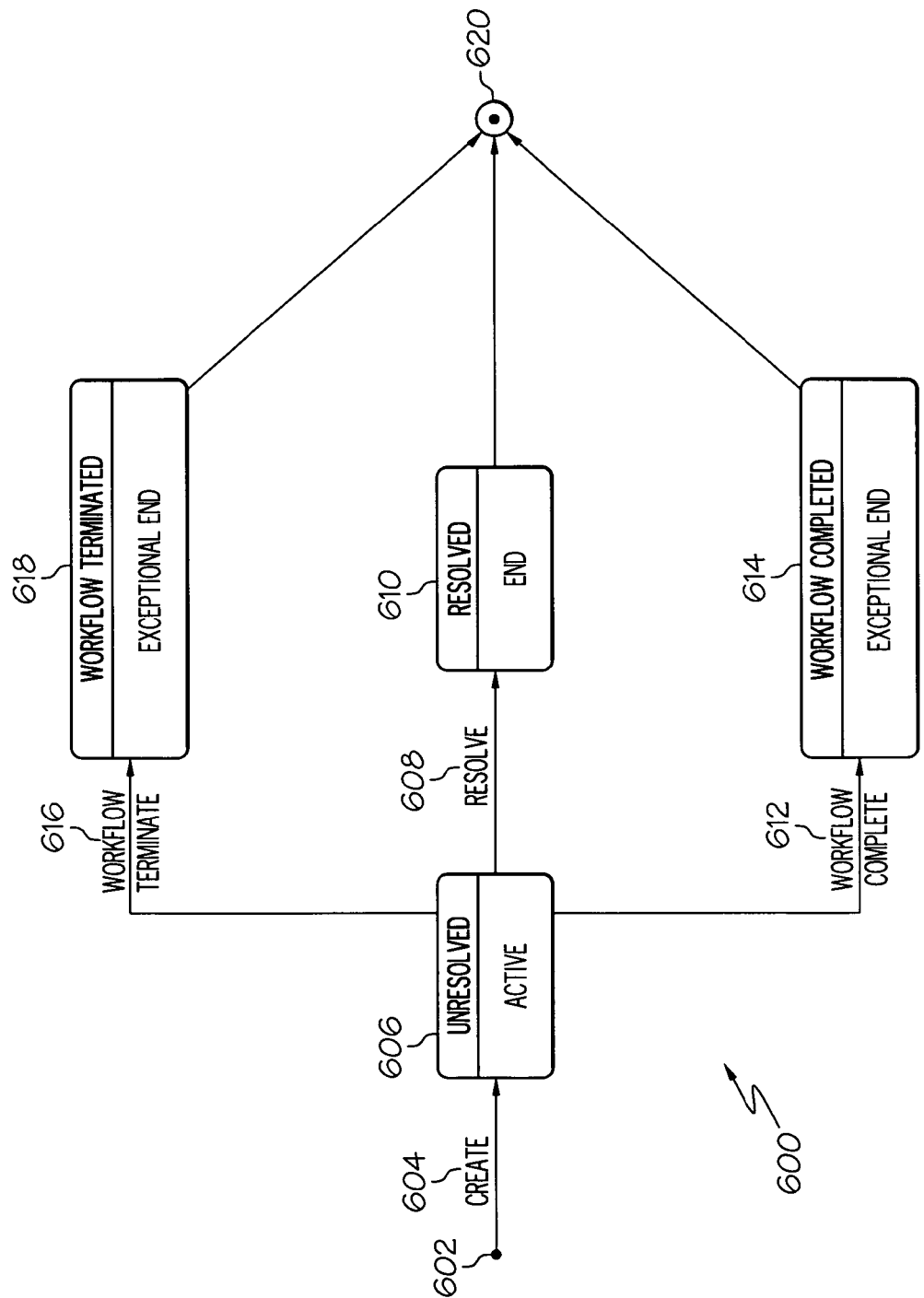
FIG. 6 depicts a diagram of steps taken to create a workflow error log by either the application engine or the BPM engine.

All Workflow Error Log States and Statuses are maintained by the WIS. All Workflow Error Log Actions are requested through the WIS. With reference now to FIG. 6, a diagram 600 shows Workflow Error Log Actions (line labels), Workflow Error Log States (underlined in boxes) and Workflow Error Log Statuses (not underlined in boxes), as well as valid State-to-State transitions (lines).

After initiator 602, a Create Action 604 creates the Workflow Error Log entry within the WIS. Calling Create Action 604 moves the Workflow Error Log into "Unresolved" state 606.

Resolve Action 608 indicates the error causing the Workflow Error Log entry to be created has been resolved. Calling this action moves the Workflow Error log into "Resolved" state 610.

Workflow Complete Action 612 indicates the Workflow Instance associated with the Workflow Error log has been completed. This action can be executed on a Workflow Error Log in "Unresolved" state 606. Calling this action moves the Workflow Error Log into "Workflow Completed" state 614.

Workflow Terminate Action 616 indicates the Workflow Instance associated with the Workflow Error log has been terminated. This action can be executed on a Workflow Error Log in "Unresolved" state 606. Calling this action moves the Workflow Error Log into "Workflow Terminated" state 618. The process ends at terminator 620.

Workflow Error Log States and Statuses

Unresolved State 606. The initial Workflow Error Log state is "Unresolved" state 606. A Workflow Error Log cannot be created in any state other than "Unresolved" state 606. A Workflow Error Log in "Unresolved" state 606 has an "Active" status. Under normal circumstances (see the section below on Exceptional Workflow Object States for other conditions), an "Unresolved" Workflow Error Log can be moved to one other state: "Resolved" state 610.

Resolved State 610. "Resolved" state 610 is the typical end of a Workflow Error Log's life cycle. A Workflow Error Log in "Resolved" state 610 has an "End" status. A Workflow Error Log in "Resolved" state 610 cannot be moved to any other state.

Exceptional Workflow Object States

There are two exceptional states that occur when a Workflow Instance obtains an "End" status and has outstanding children (Workflow Tasks or Workflow Error Logs associated with that particular Workflow Instance) having an "Active" status. These states are applied to Workflow Objects by the WIS under exceptional (and usually unexpected) conditions. Actions that cause these states to be applied are triggered only within the WIS itself as a result of another action (such as Workflow Instance termination). Workflow Objects in either of the exceptional states below have a status of "Exceptional End" which is functionally equivalent to the normal "End" status.

"Workflow Completed" state 614 is applied to Workflow Error Logs that have an active status when a parent Workflow Instance transitions to a "Completed" state. "Workflow Terminated" state 618 is applied to Workflow Tasks and Workflow Error Logs that have an active status when a parent Workflow instance transitions to a "Terminated" state.

WIS Interfaces

The WIS is made up of several key interfaces, which are depicted in FIG. 3 above in block 324. Block 324 represents three main interfaces for WIS 206: Workflow Orchestrator, Workflow Integrator, and Workflow Façade. Below are summaries of the functionality their implementations provide:

Workflow Orchestrator initializeWorkflowInstance—Creates and activates a workflow instance within the BPM Engine and creates a correlation between that workflow instance and the application reference in the Workflow Integration Subsystem. If creation is successful but activation fails, an attempt to terminate the created workflow instance will be executed before throwing the initial exception.

terminateExpiredWorkflowInstances—Terminates any expired workflow instance within the Workflow Integration Subsystem and the BPM Engine. No exception is thrown if there are no instances to terminate or if any errors occur terminating instances.

processWorkflowCompleteNotification—Completes a workflow instance within the Workflow Integration Subsystem.

createTaskCorrelation—Creates a correlation between the workflow task data and application task reference within the Workflow Integration Subsystem.

createWorkflowErrorLog—Creates a workflow error log entry within the Workflow Integration Subsystem.

processInvocationExceptionResolution—Resolves all invocation exceptions within the Workflow Integration Subsystem that share a given request type. No exception is thrown if there are no exceptions to resolve.

Workflow Integrator suspendworkflowInstance1—Suspends a workflow instance within the Workflow Integration Subsystem.

suspendWorkflowInstance2—Suspends a workflow instance by definition and application reference within the Workflow Integration Subsystem.

suspendworkflowInstances1—Suspends all workflow instances associated with a given application reference within the Workflow Integration Subsystem.

suspendWorkflowInstances2—Suspends multiple workflow instances within the Workflow Integration Subsystem.

resumeWorkflowInstance1—Resumes a workflow instance within the Workflow Integration Subsystem.

resumeWorkflowInstance2—Resumes a workflow instance by definition and application reference within the Workflow Integration Subsystem.

resumeWorkflowInstances1—Resumes all workflow instances associated with a given application reference within the Workflow Integration Subsystem.

resumeWorkflowInstances2—Resumes multiple workflow instances within the Workflow Integration Subsystem.

terminateWorkflowInstance—Terminates a workflow instance within the Workflow Integration Subsystem.

terminateWorkflowInstances1—Terminates all workflow instances associated with a given application reference within the Workflow Integration Subsystem.

terminateWorkflowInstances2—Terminates multiple workflow instances within the Workflow Integration Subsystem.

sendTaskStartNotification—Sends the Workflow Integration Subsystem a notification that a task has started within the application.

sendTaskCompleteNotification—Sends the Workflow Integration Subsystem a notification that a task has completed within the application.

sendTasksCompleteNotification—Sends the Workflow Integration Subsystem a notification that multiple tasks have completed within the application.

getworkflowInstanceIdentifiers1—Retrieves all workflow instance identifiers within the Workflow Integration Subsystem.

getWorkflowInstanceIdentifiers2—Retrieves all workflow instance identifiers from within the Workflow Integration Subsystem associated with given application reference data.

getWorkflowInstanceIdentifiers3—Retrieves workflow instance identifiers within the Workflow Integration Subsystem based on a given criteria.

getWorkflowTaskIdentifiers1—Retrieves all workflow task identifiers within the Workflow Integration Subsystem.

getWorkflowTaskIdentifiers2—Retrieves all workflow task identifiers within the Workflow Integration Subsystem associated with a given workflow instance.

getWorkflowTaskIdentifiers3—Retrieves all workflow task identifiers within the Workflow Integration Subsystem associated with given application reference data.

getWorkflowTaskIdentifiers4—Retrieves workflow task identifiers within the Workflow Integration Subsystem based on a given criteria.

getworkflowInstances1—Retrieves all workflow instances within the Workflow Integration Subsystem.

getWorkflowInstances2—Retrieves all workflow instances within the Workflow Integration Subsystem associated with given application reference data.

getWorkflowInstances3—Retrieves workflow instances within the Workflow Integration Subsystem based on a given criteria.

getWorkflowTasks1—Retrieves all workflow tasks within the Workflow Integration Subsystem.

getWorkflowTasks2—Retrieves all workflow tasks within the Workflow Integration Subsystem associated with a given workflow instance.

getWorkflowTasks3—Retrieves all workflow tasks within the Workflow Integration Subsystem associated with given application reference data.

getWorkflowTasks4—Retrieves workflow tasks within the Workflow Integration Subsystem based on a given criteria.

getWorkflowLogs1—Retrieves all workflow logs within the Workflow Integration Subsystem.

getWorkflowLogs2—Retrieves all workflow logs within the Workflow Integration Subsystem associated with given application reference data.

getWorkflowLogs3—Retrieves workflow logs within the Workflow Integration Subsystem based on a given criteria.

Workflow Façade createWorkflowInstance—Creates a workflow instance of the given process definition associating an application reference with it.

activateWorkflowInstance—Transitions a workflow instance from a created state to an active running state.

suspendworkflowInstance—Suspends a running workflow instance and its associated steps.

resumeWorkflowInstance—Resumes a suspended workflow instance and its associated steps.

terminateWorkflowInstance—Permanently terminates and removes a workflow instance from within the BPM Engine.

startWorkflowStep—Transitions a workflow step from a queued state to a started state.

completeWorkflowStep—Transitions a workflow step from a started state to a completed state. A step in a completed state is no longer active.

suspendActiveWorkflowsForReference—Queries the BPM Engine for all active workflow instances associated with a given application reference and suspends those instances.

resumeSuspendedWorkflowsForReference—Queries the BPM Engine for all suspended workflow instances associated with a given application reference and returns those instances to running states.

As described herein, the present disclosure presents an application Workflow Integration Subsystem (WIS), which acts as a generic integration layer between a vertical market (VM) software application (narrowly tailored to perform a specific task) or multiple VM software applications, and a Business Process Management (BPM) application (designed to present a flow-chart of broader steps that can be associated with steps taken by the VM software application). Integrating a BPM application with a vertical market software application allows business processes to be changed, managed, and simulated by the client. The inventive WIS facilitates a greatly simplified integration path between a VM software application and a BPM engine. Once the interface between the WIS and the application has been created, integration with any BPM application, of which there are many offered in the marketplace, becomes much simpler, allowing a service provider to offer a variety of BPM solutions to clients with minimal integration development effort. Without the WIS presented herein, a custom solution would have to be coded for each BPM engine, or greater emphasis made in exposing a services layer from those VM applications into the BPM with which clients want to integrate. The inventive WIS disclosed herein allows for multiple VM application code bases, with minimal changes needed to the WIS, to accommodate a new BPM integration solution.

A second benefit of the novel WIS disclosed herein is that it can allow a BPM engine to orchestrate business processes and tasks across multiple applications. An example of this would be orchestrating tasks between a mortgage processing software and a Call Center software application. Some employees may need to perform tasks across both applications, sometimes having to navigate back and forth between the two applications multiple times a day. By integrating the WIS with both mortgage processing software and the Call Center application, the BPM engine can be used to create tasks for both applications when needed, and navigate the user between the applications to complete the required Business Process.

Note that in a preferred embodiment and as described above, the WIS is not designed to integrate with multiple BPM engines simultaneously. Preferably, there is only one BPM engine as part of a particular production deployment. Thus, the novel WIS described herein is designed to do is make it easier to integrate with any BPM engine. The choice of BPM engine for a particular installation is based on such things as client preference or which BPM offering is best suited for a particular industry or process. All tasks needed to complete a particular business process are orchestrated through a single BPM engine executing multiple work-flows (process models). The work-flow that is executed depends on the work that needs to be completed and is communicated from the calling application, through the WIS, to the BPM engine.

On the application side of the novel WIS described herein, the WIS is designed to integrate with multiple application engines simultaneously. The application engines are programs that either allow people to do a particular task (through a user interface) or perform a task automatically by an application subsystem, without human intervention, such as ordering a credit report. The WIS integrates with multiple application engines simultaneously, in order to allow a complete business process to access multiple application engines in order to perform all of the tasks associated with executing the complete process model (e.g. process a mortgage). For example, as part of completing the process of processing a complete mortgage application, it may be necessary for a user to execute a task such as clearing a condition (executed through a User Interface—UI in an application designed to process a mortgage) and then call the borrower on the phone (executed through a UI in an application designed for customer interface over the phone such as a call center application), and then order a credit report (executed through a software application designed to communicate with an external third-party system such as ordering a credit report). The novel WIS described herein allows for easy integration with the mortgage application, the call center application, and the third-party ordering application.

Another benefit of the WIS disclosed herein is that the user, or BPM engine (in the case of automated tasks), doesn't need to know which application engine is needed in order to complete a particular task as the WIS has this "knowledge" and can provide it to a task system (in the case of human tasks) or call the correct application directly (in the case of automated tasks). For human tasks, because this information is provided by the WIS to the tasking system, when that particular task is chosen from the task list, the tasking system can automatically launch the appropriate application and the application can automatically navigate the user to the correct UI screen to perform the task. Similarly, when a task is an automated task, the WIS has "knowledge" of which application needs to be called in order to complete the automated task.

The WIS disclosed herein thus provides BPM engines with the useful ability to become "plug and play", thus allowing any single BPM engine to be used in a particular installation to execute a particular business process model consisting of multiple work-flows. Application engines become "plug and play" as well, thus permitting multiple application engines to be used in a particular installation. For example, assume that there is a need to add a new task to a process model, and none of the current application engines in the installation can perform the task. It may be possible to find a third party application that allows the task to be performed, or it might be possible that another division or group within a current service provider has already created an application that can perform this task. In either case, the WIS allows an interface to easily be built to the new application in order to utilize the functionality of the new application without having to change or redeploy any of the existing applications. Note that it may still be necessary to change the database in order to hold any new data created by the new application engine.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method for integrating an application engine with processes depicted by flow-charts created by a Business Process Management (BPM) engine, the computer-implemented method comprising:

initiating, by one or more processors, execution of a first application, wherein the first application is generated by a first application engine, wherein the first application performs a first subtask, and wherein the first subtask is depicted by a first component of a flow-chart that has been previously generated by a BPM engine;

selecting, by one or more processors executing a Workflow Integration Subsystem (WIS) that logically couples the first application engine and the BPM engine, a specific flow-chart from multiple flow-charts stored within the BPM engine, wherein the specific flow-chart contains a depiction of the first subtask performed by the first application, wherein the WIS matches the first subtask to the specific flow-chart, wherein the WIS comprises an application façade that presents a communication interface between the WIS and the first application engine, wherein the WIS comprises a workflow façade that presents a communication interface between the WIS and the BPM engine, and wherein said one or more processors provide selection logic for selecting the specific flow-chart according to a rule from a rules engine; and calling other applications, by one or more processors executing the BPM engine, to perform other subtasks that supplement the first subtask, wherein the first subtask and the other subtasks combine to perform a task depicted by the flow-chart that has been previously generated by the BPM engine.

2. The computer-implemented method of claim 1, wherein the BPM engine can communicate with one or more application engines only via the WIS, wherein all workflow instance states and statuses for tasks from the flow-chart are maintained by the WIS, and wherein all workflow instance actions for the tasks from the flow-chart are requested through the WIS.

3. The computer-implemented method of claim 2, wherein the workflow façade provides an interface that allows a functional flow-chart that is created by the BPM engine to call applications in order to create a fully-functional process.

4. The computer-implemented method of claim 3, wherein the WIS further comprises a plurality of Automated Business Objects (ABOs), wherein ABOs are engines that perform work that is requested by the BPM engine to perform the task.

5. The computer-implemented method of claim 4, wherein the ABOs are created by other applications from other application engines that are different from the first application engine, and wherein the computer-implemented method further comprises:

calling the other applications to fully enable the flow-chart that has been previously created by the BPM engine, wherein a fully enabled flow-chart includes calls to the other applications and the first application to create a fully executable process that performs all steps depicted in the task that is depicted by the flow-chart that has been previously generated by the BPM engine.

6. The computer-implemented method of claim 5, wherein calling a software program that executes steps in the computer-implemented method results in a reconfiguration of a VHSIC Hardware Description Language (VHDL) chip, wherein a resulting reconfigured VHDL chip is a hardware chip that performs steps of the computer-implemented method without executing any software.

7. The computer-implemented method of claim 1, further comprising:

calling the rules engine to determine which ABOs are needed to complete an enabling of the flow-chart.

8. The computer-implemented method of claim 1, further comprising:

selecting the specific flow chart according to information acquired from a data base that is coupled to the WIS, wherein the information describes which flow-chart matches an intended use for the first application.

9. A tangible computer-readable storage medium on which is encoded a computer program, the computer program comprising computer executable instructions configured for integrating an application engine with processes depicted by a flow-chart created by a Business Process Management (BPM) engine by performing a computer-implemented method that comprises:

initiating, by one or more processors, execution of a first application, wherein the first application is generated by a first application engine, wherein the first application performs a first subtask, and wherein the first subtask is depicted by a first component of a flow-chart that has been previously generated by a BPM engine;

selecting, by one or more processors executing a Workflow Integration Subsystem (WIS) that logically couples the first application engine and the BPM engine, a specific flow-chart from multiple flow-charts stored within the BPM engine, wherein the specific flow-chart contains a depiction of the first subtask performed by the first application, wherein the WIS matches the first subtask to the specific flow-chart, wherein the WIS comprises an application façade that presents a communication interface between the WIS and the first application en wherein the WIS comprises a workflow façade that presents a communication interface between the WIS and the BPM engine, and wherein said one or more processors provide selection logic for selecting the specific flow-chart according to a rule from a rules engine; and calling, by one or more processors executing the BPM engine, other applications to perform other subtasks that supplement the first subtask, wherein the first subtask and the other subtasks combine to perform a task depicted by the flow-chart that has been previously generated by the BPM engine.

10. The tangible computer-readable storage medium of claim 9, wherein the BPM engine and the first application engine can only communicate via the WIS, wherein all workflow instance states and statuses for tasks from the flow-chart are maintained by the WIS, and wherein all workflow instance actions for the tasks from the flow-chart are requested through the WIS.

11. The tangible computer-readable storage medium of claim 10, wherein the workflow façade provides an interface that allows the BPM engine to choose and execute a functional flow-chart that is created by the BPM engine and allows the BPM engine to call applications in order to create a fully-functional process.

12. The tangible computer-readable storage medium of claim 11, wherein the WIS further comprises a plurality of Automated Business Objects (ABOs), wherein ABOs are engines that perform work that is requested by the BPM engine to perform the task.

13. The tangible computer-readable storage medium of claim 12, wherein the ABOs are created by other applications from other application engines that are different from the first application engine, and wherein the computer-implemented method further comprises:

calling the other applications to fully enable the flow-chart that has been previously created by the BPM engine, wherein a fully enabled flow-chart includes calls to the other applications and the first application to create a fully executable process that performs all steps depicted in the task that is depicted by the flow-chart that has been previously generated by the BPM engine.

14. The tangible computer-readable storage medium of claim 13, wherein calling a software program that executes steps in the computer-implemented method results in a reconfiguration of a VHSIC Hardware Description Language (VHDL) chip, wherein a resulting reconfigured VHDL chip is a hardware chip that performs steps of the computer-implemented method without executing any software.

15. The tangible computer-readable storage medium of claim 9, wherein the computer-implemented method further comprises:

calling data in a database to determine which ABOs are needed to complete an enabling of the flow-chart.

16. The tangible computer-readable storage medium of claim 9, wherein the computer executable instructions are provided by a service provider to an execution computer in an on-demand basis.

\* \* \* \* \*